(12) United States Patent
Zhang et al.

(10) Patent No.: US 7,870,566 B2
(45) Date of Patent: Jan. 11, 2011

(54) APPLICATION INTEGRATION FOR OPERATING SYSTEMS WITHOUT INTER-PROCESS INTEGRATION SUPPORT

(75) Inventors: Yao Zhang, Beijing (CN); Yan Bin Gao, Beijing (CN); Yong Lin Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 11/466,866

(22) Filed: Aug. 24, 2006

(65) Prior Publication Data

US 2007/0074181 A1 Mar. 29, 2007

(30) Foreign Application Priority Data

Aug. 26, 2005 (CN) .................. 2005 1 0092331

(51) Int. Cl.
*G06F 3/048* (2006.01)
(52) U.S. Cl. .................. 719/318; 719/329; 715/766; 715/794; 715/804; 715/805
(58) Field of Classification Search .................. 719/318; 715/766, 794
See application file for complete search history.

(56) References Cited

U.S. PATENT DOCUMENTS

| | | | | | |
|---|---|---|---|---|---|
| 5,333,302 | A | * | 7/1994 | Hensley et al. | 714/37 |
| 5,724,532 | A | * | 3/1998 | Thomson | 719/329 |
| 5,903,728 | A | * | 5/1999 | Semenzato | 709/217 |
| 6,460,089 | B1 | * | 10/2002 | Romano et al. | 719/310 |
| 6,604,150 | B1 | * | 8/2003 | Gebhart et al. | 719/328 |
| 6,629,152 | B2 | * | 9/2003 | Kingsbury et al. | 719/313 |
| 7,310,781 | B2 | * | 12/2007 | Chen et al. | 715/769 |
| 2003/0126311 | A1 | | 7/2003 | Kushnirskiy et al. | |
| 2003/0172172 | A1 | | 9/2003 | de Bonet et al. | |
| 2003/0182450 | A1 | | 9/2003 | Ong et al. | |
| 2004/0030879 | A1 | | 2/2004 | Subramanian et al. | |
| 2004/0225994 | A1 | | 11/2004 | Wason et al. | |
| 2005/0033763 | A1 | | 2/2005 | Chen et al. | |
| 2005/0088449 | A1 | * | 4/2005 | Blanco et al. | 345/547 |

OTHER PUBLICATIONS

Tanenbaum, Andrew S. Modern Operating Systems. 2001. Prentic-Hall, Inc. 2nd Edition. pp. 119-123.*
IEEE 100, The Authoritative Dictionary of IEEE Standards Terms. 7th Edition. (2000). pp. 46, 574-576.*
Sydow, D.P, Mac OS X Programming, 2002, New Riders Publishing, 2nd Ed., pp. 42-43,69-87,94-156.*
Apple, Inc., "Plug-ins Data Management: Event Handling" (Mar. 3, 2005) [retrieved from http://developer.apple.com/mac/library/documentation/CoreFoundation/Conceptual/CFPlugIns/CFPlugIns.pdf on Aug. 25, 2010].*

* cited by examiner

*Primary Examiner*—H. S. Sough
*Assistant Examiner*—Brian Wathen
(74) *Attorney, Agent, or Firm*—Lee Law, PLLC; Christopher B. Lee

(57) ABSTRACT

To integrate a parent application and a child application, the parent application receives events through a user interface. If the events are to be processed by the child application, they are propagated to the child application. The child application generates content data based on the received events, writes the content data into a storage module, and then notifies the parent application. The parent application reads out the content data written in the storage module.

19 Claims, 3 Drawing Sheets

US 7,870,566 B2

APPLICATION INTEGRATION FOR OPERATING SYSTEMS WITHOUT INTER-PROCESS INTEGRATION SUPPORT

FIELD OF THE INVENTION

The invention relates to parent/child application integration, and particularly relates to a method and system for parent/child application integration.

BACKGROUND

A child application that can be integrated into a parent application is indispensable for a system that adopts plug-in technology, such as Workplace Client Technology (WCT) wherein the child application usually takes the form of a plug-in.

On an operating system (OS) that supports window identifiers in different processes, for example on MICROSOFT® WINDOWS® system, application integration is implemented with OLE/ActiveX, and thus Application Plug-in is implemented as well. As for an application integration of non-OLE/ActiveX control, a more general approach is needed. In fact, if an OS were to provide applications in different processes with window identifiers that are process independent, it would be easy to build up application integration between processes. For instance, on MICROSOFT® WINDOWS® system we are able to build up parent/child relationships between windows in the different processes because each of the windows is identified by a process independent handle, hWnd.

Thus where a user wants to use another application (B) as a plug-in in its own application (A), the approach mentioned above would appear to be of particular use in the following three adverse situations: wherein the OS provides no process independent window identifier; wherein application B does not provide the user with a control that conforms to some component standard; and wherein application B is a very complex application which requires a great effort to rewrite so as to conform to some component standard. In addition, by this approach, the function of the plug-in application may be revised with minimal change to its original structure.

However, on an OS that does not support a process independent window identifier, for example on APPLE® MAC OS X® system, it is hard to implement application integration between processes in the windowing system level. That is because, when an application is created by an application manager, the OS is unable to provide applications in different processes with process independent identifiers. Taking MAC OS X® system as an example, when a window is created by a Window Manager, the user may obtain WindowRef that identifies this window. But this WindowRef is a pointer variable which is valid only in its own process. Moreover, the structure of WindowRef is opaque (internal structure). This means that even though the memory pointed to may be accessed by WindowRef from other processes, the window cannot be operated on directly. In fact, WindowRef is only an index number of some windows controlled by Window Manager. Window Manager can control all of the windows, but we can't. So, on APPLE® MAC OS X® system, parent/child relationships between windows in different processes cannot be implemented in the windowing system level. As a consequence, on this kind of OS there is a need to simulate this relationship to implement application integration between processes in windowing system level. For example, on APPLE® MAC OS X® system, parent/child relationships between windows in different processes are simulated so as to implement Application Plug-in.

Due to the problems described above, it is very difficult to secure normal activities of user interfaces in application integration. Normally, in activities of parent/child windows, the following apply: (1) the child window will always be in front of the parent window (Z order); (2) the child window and parent window will move together; (3) the child window and parent window will resize together; (4) the child window and parent window will Maximize/Minimize together; and (5) events of the child window can be propagated to the parent window. Activities (2) to (5) can be performed with an that does not support process independent window identifiers, such as on APPLE® MAC OS X® system. However, activity (1) cannot be simulated with existing functions because the correct Z order cannot be secured between windows in different processes.

Two disadvantages remain in the course of implementation of application integration between processes on an OS that does not support process independent window identifiers. First, since the prior art usually adopts inter-process communication (IIPC), the cost will be great when frequent user events exist and the time for reading/writing storage module is too long. Second, a great effort is required to modify a program interface if Windows' OLE or similar component technology is to be carried out in a large and complex application that does not support component technology.

SUMMARY

According to one aspect of present invention, there is provided a method for integrating a parent application and a child application. The parent application receives at least one event through a user interface. If the event is to be processed by the child application, the at least one event is propagated to the child application; the child application generates content data based on the at least one received event, writes the content data into a storage module, and then notifies the parent application; and the parent reads out the content data written in the storage module.

According to another aspect of present invention, there is provided a system for integrating a parent application and a child application. The system comprises: a user event interface process module, through which the parent application receives at least one event; a child application event process module; a first communication module for propagating the at least one event from the user event interface process module to the child application event process module if the event is to be processed by the child application; wherein the child application event process module generates content data based on the received at least one event; a storage module for storing, the content data generated by the child application event process module; a content update module for writing the content data into the storage module from the child application event process module; a content reading module; and a second communication module for sending a notification to the content reading module from the child application after the storage module stores the content data; wherein the content reading module reads out the content data Written in the storage module, when the notification is received.

With the inventive method and system for integrating a parent application and a child application, parent/child application integration between processes, application plug-in between processes and seamless parent/child relationship between windows in different processes can be implemented in a windowing system level on an OS that does not support application integration between processes, bringing about the following technical effects. Firstly, plug-in applications can readily be used by other applications even if the interface is generally predefined, since the parent application does not need to know any details of the child application, the interface of all kinds of child applications is the same (including display interface and communication interface), and the communication interface can be designed to forward the system's basic keyboard and mouse events to the child application. Moreover, application plug-in and child windows are easily used by other main applications and other parent windows, respectively. Secondly, displaying with Z order can be simulated in a windowing system level on an OS that does not support application integration between processes. Finally, efficiency due to the use of IPC can be improved.

BRIEF DESCRIPTION OF DRAWINGS

The present invention can be understood more easily from the following detailed description when taken in conjunction with the accompanying drawings in which identical reference signs indicate parts of the same structure, and in which.

DETAILED DESCRIPTION

An embodiment of the present invention will be described hereinafter in detail in conjunction with the drawings. In the following description, known methods and modules on a conventional OS that does not support application integration between processes are omitted so as to prevent unnecessary details from confusing the present invention. In the description of present invention, windows corresponding to parent applications and windows corresponding to child applications are referred to as parent windows and child windows, respectively.

Figure 1:
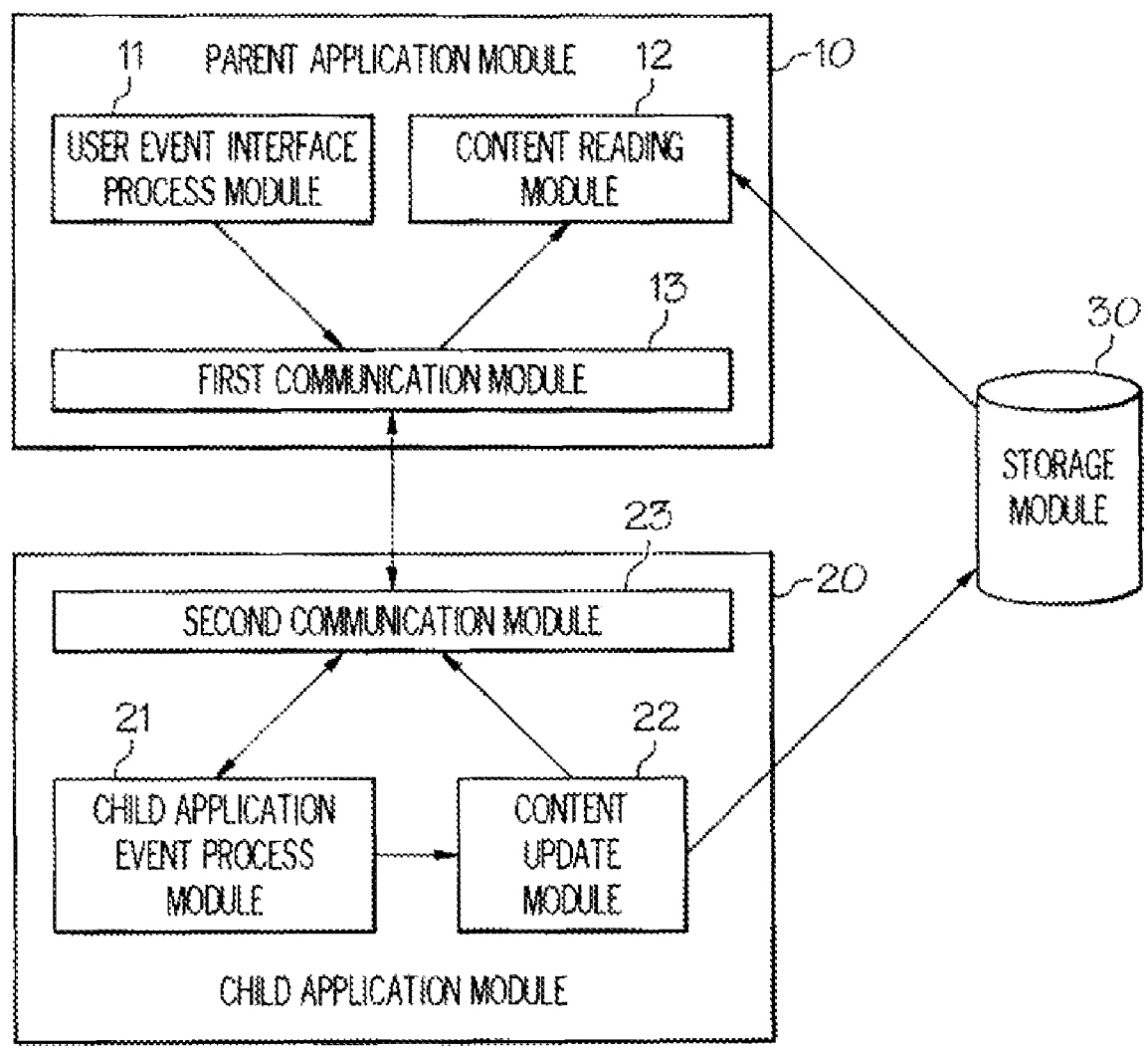
FIG. 1 is a schematic block diagram illustrating a preferred embodiment of a system for integrating a parent application and a child application according to present invention.

FIG. 1 is a schematic block diagram illustrating a preferred embodiment of a system for integrating a parent application and a child application according to present invention. The system comprises a user event interface process module 11, through which the parent application receives at least one event, a child application event process module 21; a first communication module 13 that propagates the at least one event from the user event interface process module to the child application event process module through a second communication module 23 if the event is to be processed by the child application, wherein the child application event process module generates content data based on the at least one received event; a storage module 30 for storing the content data generated by the child application event process module; a content update module 22 for writing the content data in the storage module from the child application event process module; a content reading module 12; wherein the second communication module 23 sends a notification to the content reading, module through a first communication module 13 from the child application after the storage module stores the content data, and wherein the content reading module reads out the content data written in the storage module, when the notification is received.

The first communication module 13 may directly propagate the at least one event from the user event interface process module to the child application event process module, without the second communication module 23. Similarly, the second communication module 23 may also communicate a notification to the content reading module directly from the child application, without the first communication module 13.

With the system, access of the child application by the parent application in a windowing system level can be implemented on a conventional OS that does not support application integration between processes (such as on APPLE® MAC OS X® system), even if the parent application and the child application respectively belong to different processes. In addition, it is able to exchange and update data consistently and transparently. Thus, application integration may be simulated in the windowing level without having to developing large and complex program interface module.

In the system, the storage module 30 may adopt common transfer media, such as shared memory, shared file, and so on, without being limited to shared display buffer. Thus, simulation of application integration can be carried out without the cost of display resources.

Z order car be simulated based on the system. That is, a child window may always be in front of the parent window. Work flow of simulation of Z order will be described hereafter.

Figure 3:
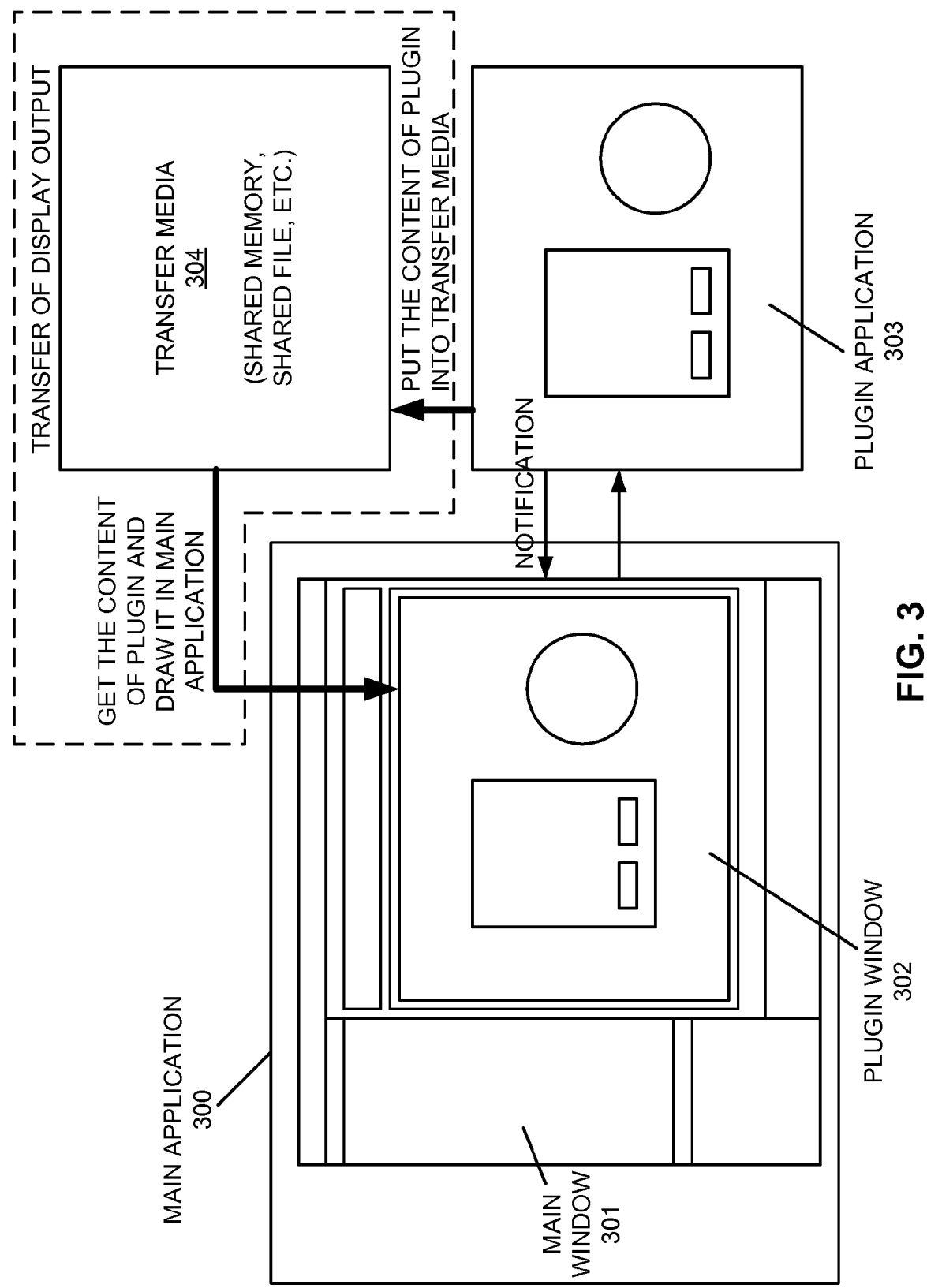
FIG. 3 is a basic work flow illustrating a preferred embodiment of a method/system implementing parent/child application integration between processes according to present invention.

FIG. 3 is a basic work flow illustrating a preferred embodiment of a system implementing parent/child application integration between processes according to present invention, wherein plug-in window 302, plug-in application 303 and transfer media 304 correspond to the above-mentioned child window, child application, and storage module, respectively. As illustrated in FIG. 3 when the plug-in application 303 is activated, the plug-in window 302 will be in front of the parent window 301, because the former is the front-most process. In this situation, no Z order problem exists. In other words, parent window (main window 301) and plug-in window 302 meet Z order currently, and the activated plug-in application 303 may process the received user interface events. However, when plug-in application 303 is deactivated, or in other words when user focus switches to the other main application region, the system may be used for parent/child application integration to simulate the Z Order according to the preferred embodiment of present invention.

Based on the parent application (main application 300), parent window 301, plug-in window 302, plug-in application 303), and transfer media 304, FIG. 3 shows work flow for simulating Z order by the system implementing parent/child application integration between processes according to a preferred embodiment of present invention. As illustrated in FIG. 3, corresponding to the above-mentioned data transmission carried out among user event interface processes module 11 content reading module 12, first communication module 13, child application event process module 21 content update module 22, second communication module 23, and storage module 30, if the user interface event received by parent application 300 is to be processed by plug-in application 303, the parent application propagates to plug-in application 303 at least one of the events received through user interface loop. Plug-in application 303 generates content data based on the at least one received event, writes the content data into transfer media 304, and then notifies parent application 300. Parent application 300 reads out the content data written in transfer media 304. At the same time, a display module displays the activated parent application window 301 and plug-in window 302, wherein plug-in window 302 is in front of parent application window 301 (Z order). Afterward, the display module further refreshes plug-in window 302 according to the content data read out by parent application process module 10, while retaining Z order of windows display. Thus, no matter whether plug-in application 303 is activated or not, plug-in window 302 is always in front of parent window 301, realizing the simulation of Z order of a seamless parent/child relationship between windows of different processes.

When the parent application 300 refreshes plug-in window 302 according to the read out content data, the parent application can selectively use the content data that have been read out from transfer media 304.

The system of the present invention propagates user events from parent applications to plug-in applications only when a plug-in application is deactivated, which brings about two improvements: (1) preventing all user events from being propagated from parent application to plug-in application, and thus reducing the times of IPC and storage module reading/writing and raising efficiency; (2) requiring less modification to plug-in applications, for instance, there is no need to write additional user event handlers.

Figure 2:
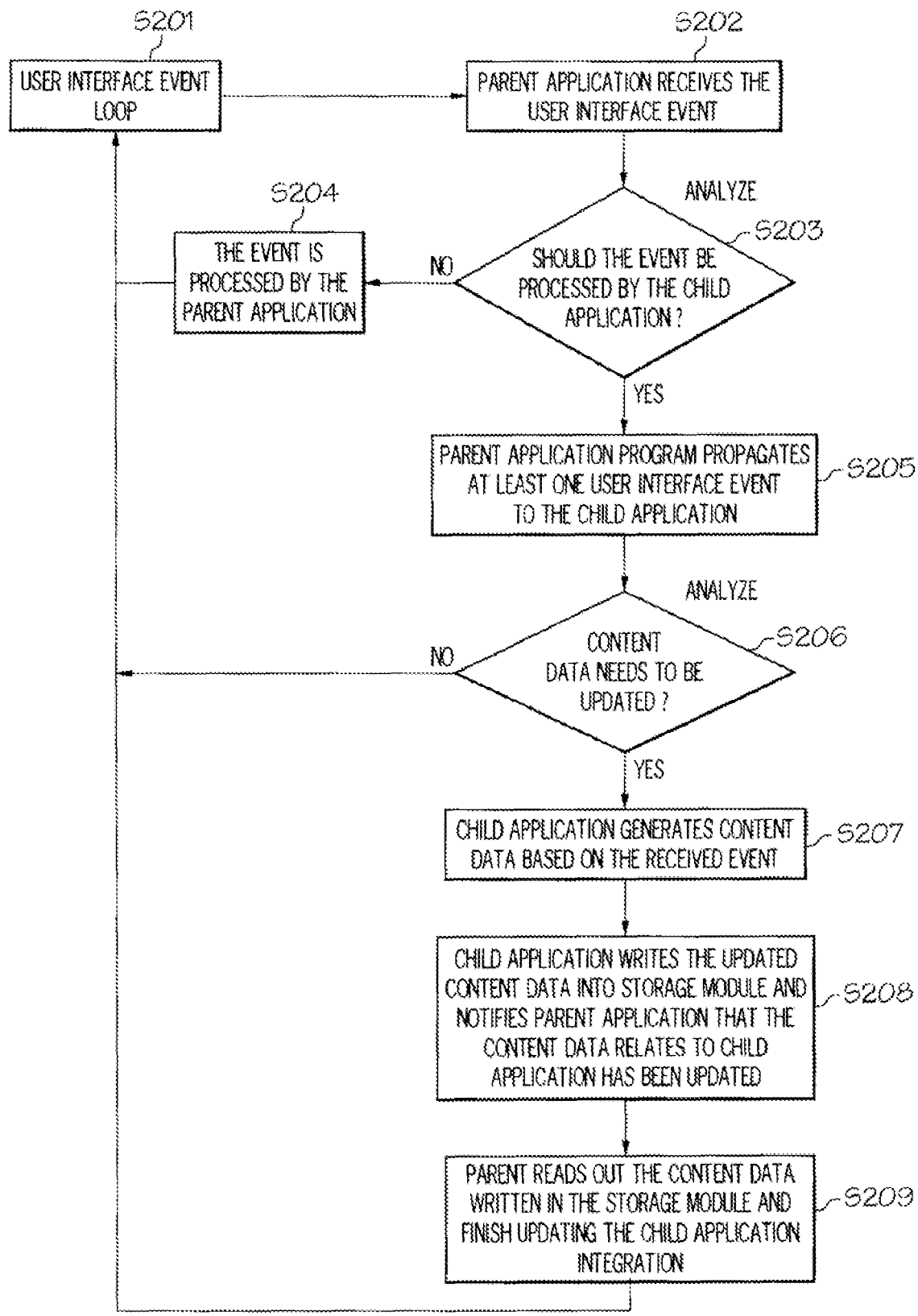
FIG. 2 is a schematic flow chart illustrating a preferred embodiment of a method for integrating a parent application and a child application, according to present invention.

FIG. 2 is a schematic flow chart illustrating a preferred embodiment of a method for integrating a parent application and a child application according to present invention. A method for integrating a parent application and a child application according to a preferred embodiment of the present invention will be described hereinafter in conjunction with FIG. 2.

At step S201, a user interface event loop is performed. Then at step S202, the parent application receives the user interface event. At step S203, the parent application determines whether the user interface event should be processed by the child application. If no, the method goes to step S204, where the user interface event is processed by the parent application, and then returns to step S201, where user interface event loop is continued. If yes, the method proceeds to step S205, where the parent application propagates at least one user interface event to the child application. Then the method proceeds to step S206, where the child application determines whether content data needs to be updated according to the received user interface event. If no, the method returns to step S201, where user interface event loop is continued. If yes, the method proceeds to step S207, where the child application generates content data based on the received event. Then, at step S208, the child application writes the content data into a storage module and notifies the parent application, followed by step S209 where the parent reads out the content data written in the storage module and finishes updating the child application integration. Finally, the method returns to step S201 to continue the user interface event loop.

In the method of present invention, parent applications and child applications may be constructed with well-known technologies. Also, note that step S206, wherein the child application determines whether content data needs to be updated according to the received user interface event, is not indispensable. Rather, the method may proceed from step S205 to step S207 directly. So, access of the child application by the parent application in a windowing system level may be implemented on a conventional OS that does not support application integration between processes (such as on APPLE® MAC OS X® system), even if the parent application and the child application respectively belong to different processes. Data exchange and updating may be conducted consistently and transparently. Thus, application integration may be simulated in the windowing level without having to developing large and complex program interface module.

In the present method, the storage module may be such common transfer media as shared memory, shared files, and so on, without being limited to a shared display buffer. Thus, simulation of application integration can be carried out without the cost of display resources.

Z order can be simulated based on the present method. That is, a child window will always be in front of the parent window. Work flow of simulation of Z order will be described hereafter.

FIG. 3 is a basic work flow illustrating a preferred embodiment of a method implementing parent/child application integration between processes according to present invention, wherein plug-in window 302, plug-in application 303, and transfer media 304 correspond to the above-mentioned child window, child application, and storage module, respectively. When the plug-in application 303 is activated, the plug-in window 302 will be in front of the parent window 301 because the former is the front-most process. In this case, no Z order problem exists. In other words, parent window 301 and plug-in window 302 meet Z order currently. This situation does not require using use the method implementing parent/child application integration according to the preferred embodiment of present invention, instead plug-in application 303 itself processes the received user interface event. However, when plug-in application 303 is deactivated, or in other words when user focus switches to the other main application region, the method for parent/child application integration may be used to simulate the Z Order according to the preferred embodiment of present invention.

Based on parent application 300, parent window 301, plug-in window 302, plug-in application 303, and transfer media 304, FIG. 3 shows work flow for simulating Z order by the method implementing parent/child application integration between processes according to a preferred embodiment of present invention. As illustrated in FIG. 3, corresponding to the above-mentioned step S201, the user interface event loop is performed while the screen displays the activated parent window 301 and plug-in window 302, wherein plug-in window 302 is in front of parent application window 301 (Z order). Corresponding to the steps S202-S206, if the user interface event received by parent application 300 is to be processed by plug-in application 303, the parent application 300 propagates to plug-in application 303 at least one of the events received through user interface loop, while parent window 301 and plug-in window 302 retain displaying in Z order. Corresponding to the steps S207-S209, plug-in application 303 generates contents data based on the at least one received event, writes the content data into transfer media 304, and sends a notification to the parent application 300. Then, the parent application 300 reads out the content data written in transfer media 304. Here, before returning to step S201, the parent application 300 further refreshes plug-in window 302 according to the read out content data at step S209, while the Z order of windows display are retained at steps S207-S209. Thus, no matter whether plug-in application 303 is activated or not, plug-in window 302 is in front of parent window 301, which implements the simulation of Z order of a seamless parent/child relationship between windows of different processes.

When the parent application 300 refreshes plug-in window according to the read out content data, it can selectively use the content data that have been read out from transfer media.

The method of present invention propagates user events from parent applications to plug-in applications only when a plug-in application is deactivated, which brings about two improvements: (1) preventing all user events from being propagated from parent application to plug-in application and thus reducing the times of IPC and storage module reading/writing and raising efficiency; (2) requiring less modification to plug-in applications; for instance, there is no need to write additional user event handlers.

While the preferred embodiments of the present invention have been described in conjunction with the drawings, the present invention is not limited to these exemplary embodiments and various changes can be made without departing from the spirit and scope of the invention as defined by the appended claims.

We claim:

1. A method, comprising:
receiving, via a main application executing on a computing system that integrates the main application with a plug-in application, an event through a user interface of the computing system; and
simulating, via the main application, Z order within the user interface between a parent window that corresponds to the main application and a child window that corresponds to the plug-in application by:
determining whether the child window is deactivated;
propagating the event to the plug-in application if the event is to be processed by the plug-in application and the child window is deactivated; and
in response to propagating the event to the plug-in application:
receiving, via the main application, a notification from the plug-in application that content based data has been generated by the plug-in application and written to a storage module in response to the propagated event; and
reading the content data, via the main application, written to the storage module by the plug-in application.

2. The method as claimed in claim 1, wherein the storage module is one of: a shared memory, a shared file, and a shared display buffer.

3. The method as claimed in claim 1, wherein the main application and the plug-in application belong to different processes.

4. The method as claimed in claim 1, wherein the main application and the plug-in application run on an operating system that does not support application integration between processes.

5. The method as claimed in claim 1, further comprising determining whether the plug-in application is deactivated and where propagating the event to the plug-in application if the event is to be processed by the plug-in application and the child window is deactivated comprises propagating the event to the plug-in application if the event is to be processed by the plug-in application and the plug-in application is deactivated.

6. The method as claimed in claim 1, further comprising refreshing, by the main application, the child window corresponding to the plug-in application according to the content data.

7. The method as claimed in claim 1, wherein the main application selectively uses content data read out from the storage module.

8. The method as claimed in claim 1, further comprising processing the event via the main application if the event is to be processed by the main application.

9. A system, comprising:
a main application module that simulates Z order within a user interface between a parent window that corresponds to a main application and a child window that corresponds to a plug-in application by propagating an event to the plug-in application in response to determining that the event is to be processed by the plug-in application and that the child window is deactivated;
a user event interface process module through which the main application receives events;
a plug-in application event process module that generates content data in response to receipt of the propagated event by the plug-in application;
a first communication module that propagates the event from the main application to the plug-in application event process module in response to the main application determining that the event is to be processed by the plug-in application;
a storage module that stores the content data generated by the plug-in application event process module;
a content update module that writes the content data to the storage module from the plug-in application event process module;
a content reading module that reads out, via the main application, the content data written to the storage module responsive to a notification; and
a second communication module that notifies the main application via the content reading module from the plug-in application in response to the storage module storing the content data.

10. The system as claimed in claim 9, wherein the storage module is one of: a share memory, a shared file, and a shared display buffer.

11. The system as claimed in claim 9, wherein the main application and the plug-in application belong to different processes.

12. The system as claimed in claim 9, wherein the main application and the plug-in application run on an operating system that does not support application integration between processes.

13. The system as claimed in claim 9, wherein the main application module further determines whether the plug-in application is deactivated and where propagating the event to the plug-in application in response to determining that the event is to be processed by the plug-in application and that the child window is deactivated comprises propagating the event to the plug-in application in response to determining that the event is to be processed by the plug-in application and that the plug-in application is deactivated.

14. The system as claimed in claim 9, further comprising a display module for refreshing, via the main application, the child window corresponding to the plug-in application according to content data read out by the main application via the content reading module.

15. The system as claimed in claim 9, wherein the main application selectively uses content data read out from the storage module.

16. The system as claimed in claim 9, where the main application processes the event if the event is to be processed by the main application.

17. A computer program product comprising a computer usable medium having computer usable program code embodied therewith, the computer usable medium comprising:
computer usable program code configured to receive, via a main application, an event through a user interface; and
computer useable program code configured to simulate, via the main application, Z order within the user interface between a parent window that corresponds to the main application and a child window that corresponds to a plug-in application using:
computer usable program code configured to determine whether the child window is deactivated;

computer usable program code configured to propagate the received event to the plug-in application if the event is to be processed by the plug-in application and the child window is deactivated; and computer useable code configured to, in response to propagating the event to the plug-in application:
- receive, via the main application, a notification from the plug-in application that content based data has been generated by the plug-in application and written to a storage module in response to the propagated event; and
- read the content data, via the main application, written to the storage module by the plug-in application.

18. The computer program product as claimed in claim 17, further comprising computer usable program code configured to refresh, by the main application, the child window corresponding to the plug-in application according to the content data.

19. The computer program product as claimed in claim 17, further comprising computer usable program code configured to process, via the main application, the event if the event is to be processed by the main application.

* * * * *